(12) United States Patent
Turchin et al.

(10) Patent No.: US 6,473,266 B1
(45) Date of Patent: Oct. 29, 2002

(54) MAGNETIC RECORDING DISKETTE HAVING REDUCED-AREA FABRIC LINER

(75) Inventors: Ronald H. Turchin, Fergus Falls, MN (US); Jeffrey T. Gibbs, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 35 days.

(21) Appl. No.: 09/653,341

(22) Filed: Aug. 31, 2000

(51) Int. Cl.$^7$ ............................................. G11B 23/033
(52) U.S. Cl. ...................................................... 360/133
(58) Field of Search ........................................ 360/133

(56) References Cited

U.S. PATENT DOCUMENTS

| | | |
|---|---|---|
| 4,120,012 A | 10/1978 | Bowers |
| 4,568,994 A | 2/1986 | Lynch |
| 4,610,352 A | 9/1986 | Howey et al. |
| 4,648,002 A | 3/1987 | Mroz et al. |
| 4,769,733 A * | 9/1988 | Freeman et al. ............ 360/133 |
| 4,843,511 A | 6/1989 | Downey |
| 5,189,585 A | 2/1993 | Kubo |
| 5,212,614 A | 5/1993 | Dudzik et al. |
| 5,532,893 A | 7/1996 | Laska et al. |
| 5,561,574 A | 10/1996 | Engel et al. |
| 5,582,901 A | 12/1996 | Howey et al. |
| 5,812,351 A | 9/1998 | Wulfing et al. |
| 5,980,791 A | 11/1999 | Berscheid et al. |
| 6,134,082 A | 10/2000 | Uwabo et al. |

FOREIGN PATENT DOCUMENTS

| | | |
|---|---|---|
| EP | 0 004 454 | 10/1979 |
| EP | 0 457 459 | 11/1991 |
| JP | 2306486 | 12/1990 |
| JP | 4098670 | 3/1992 |
| JP | 4162281 | 6/1992 |
| JP | 5225744 | 9/1993 |
| JP | 6218211 | 8/1994 |
| JP | 9035443 | 2/1997 |
| JP | 10162542 | 6/1998 |
| WO | WO 99/24983 | 5/1999 |

OTHER PUBLICATIONS

Research Disclosure 219033 (Jul. 10, 1982), Reducing fabric permeability—of fabrics produced by joining spiral monofilaments, by application of foam to the surface (Derwent, Abstract only).

Research Disclosure 213009 (Jan. 10, 1982), Point bounded nonwoven fabrics—with reduced bond point size for improved appearance (Derwent, Abstract only).

Research Disclosure 205005 (May 10, 1981), Reducing bumps on flexible video discs—using cushioning layer between disc and support to minimize effects of dust particles (Derwent, Abstract only).

* cited by examiner

Primary Examiner—Robert S. Tupper
(74) Attorney, Agent, or Firm—Eric D. Levinson

(57) ABSTRACT

The invention presents a magnetic recording disc cartridge with two small fabric liners affixed inside the media compartment. One liner covers the lifter and the other covers the raised structure. The lifter and the raised structure bring the liners in contact with the flexible surface of the disc as it rotates, thus cleaning the disc. One or more protrusions in the media compartment prevent the disc from abrading the surface of the media compartment.

24 Claims, 5 Drawing Sheets

US 6,473,266 B1

MAGNETIC RECORDING DISKETTE HAVING REDUCED-AREA FABRIC LINER

TECHNICAL FIELD

This invention relates to rotating data storage media, and more particularly to magnetic recording diskettes.

BACKGROUND

Floppy magnetic recording diskettes represent a popular storage medium in many computer systems. The recording disc within the diskette is a flexible sheet of polyester resin or the like having a magnetic layer on each side, upon which information is recorded by a magnetic read/write head. The disc includes a hub fixed within a central aperture of the flexible disc. Although floppy discs have been and continue to be manufactured in many sizes, one of the most enduring and popular sizes is the disc sized for a diskette cartridge that is approximately 3.5 inches (8.9 cm) wide. Generally, the disc is accommodated in a generally rigid casing to form a diskette cartridge comprising a cover shell and a back shell, which may be referred to together as a housing. Typically, a movable shutter is included in the diskette, and positioned to cover a media access opening. The shutter is ordinarily biased to the closed position to protect the disc from exposure to the elements. The shutter can be opened to allow access to the disc by a read/write head. The disc rotates within a media compartment inside the cartridge. In particular, a spindle motor within the drive engages the hub to rotate the disc.

The cartridge generally includes two fabric liners, one on each inner surface of the cartridge shells. The liners are kept in contact with the recording surface of the disc to remove debris on the recording surface while the disc rotates. The liner adjacent the back shell is kept pressed against the entire width of the recording surface by a lifter that is secured to the inner surface of the back shell. The lifter supports the fabric liner upward. Typically, a raised structure is provided on the inner surface of the cover shell above but slightly offset from the location of the lifter on the back shell. The lifter and the raised structure help to press the fabric liners into contact with the disc, thereby facilitating cleaning of the disc when the disc is rotated within the cartridge.

SUMMARY

Many liners are about the size of the disc, with a radial width approximately equal to the width of the flexible surface of the disc. Liners of this kind cover the majority of the media compartment. Consequently, most liners cover most of the media recording area of the disc. The invention provides a new liner configuration that provides a reduction in the material needed for a liner, resulting in less expense and less waste.

In one embodiment, the invention presents an article of manufacture, including a magnetic recording disc with a flexible surface, a housing defining a media compartment and a fabric liner secured to an interior surface of the housing. In some embodiments, the area of the fabric liner may be less than fifty percent of the area of the flexible surface of the magnetic recording disc. The liner may be in an arcuate shape. One liner may cover a lifter mounted to the interior surface of the housing, and another may cover a raised structure also mounted to another interior surface of the housing. In particular, first and second liners may be mounted to interior surfaces of back and cover shells that together form the housing. A protrusion in the media compartment, such as a bump, rib or ridge, forces the disc away from the surface of the media compartment, preventing the disc from abrading the surface and thus maintaining the durability of the media.

In another embodiment, the invention presents an article of manufacture including a housing defining a media compartment to accommodate a magnetic recording disc, and a fabric liner secured to the media compartment of the shell. The area of the fabric liner may be less than fifty percent of the area of the media compartment.

In a further embodiment, the invention presents a fabric liner for cleaning the surface of a magnetic recording disc. The liner's outer edge is concavely curved with approximately the same curvature as the circumference of the magnetic recording disc, and the area of the fabric liner may be less than fifty percent of the area of the flexible surface of the magnetic recording disc. The liner's inner edge is convexly curved with approximately the same curvature as the outer edge.

In another aspect, the invention presents an efficient method for making fabric liners from a strip of material. The method entails cutting the outer edge of the liner from the strip, the outer edge being concavely curved with approximately the same curvature as the circumference of a magnetic recording disc. The method further involves cutting the inner edge of the liner from the strip, the inner edge being convexly curved with approximately the same curvature as the outer edge.

In another embodiment, the invention presents an article of manufacture including a shell defining a media compartment to accommodate a magnetic recording disc. The shell includes a protrusion in the media compartment. The protrusion prevents the disc from abrading the surface of the media compartment.

In an additional embodiment, the invention presents a method whereby the magnetic recording disc is kept from contacting the inner surface of the media compartment. The method entails providing a cartridge that includes a media compartment and including a protrusion extending inward from the inner surface of the media compartment. When the protrusion comes in contact with the magnetic recording disc, the protrusion keeps the magnetic recording disc from contacting the inner surface of the media compartment.

Other advantages, features and embodiments of the present invention will become apparent from the following detailed description and claims.

DETAILED DESCRIPTION

Figure 1:
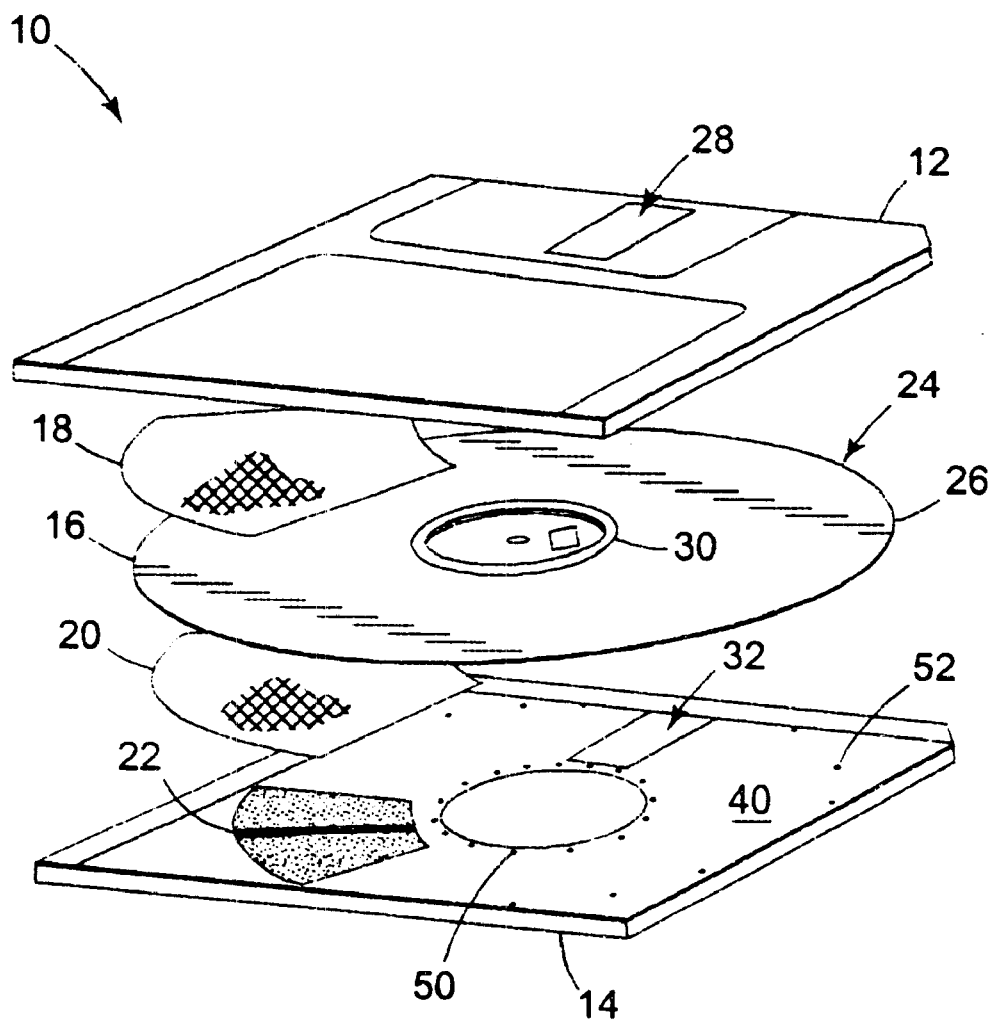
FIG. 1 is an exploded perspective view of a magnetic recording disc cartridge.

FIG. 1 shows a magnetic recording disc cartridge 10 in an exploded perspective view. The cartridge 10 is comprised of a cover shell 12 and a back shell 14, which enclose a floppy magnetic recording disc 16. A media access opening 28 in the cover shell 12 and a media access opening 32 in the back shell 14 allow access to the disc 16 by a read/write head. In the example of FIG. 1, disc 16 may include a flexible surface 24, with a surface area of about 8 square inches (51.6 square cm). This surface area conforms to that of discs typically employed in 3.5 form factor floppy diskettes, but should not be read as limiting of the invention. Disc 16 also includes a rigid hub 30.

The cartridge shells 12 and 14 each have a fabric liner 18 and 20, respectively, affixed to their inner surfaces as described in more detail below. As depicted in FIG. 1, each fabric liner 18 and 20 has an arcuate or bowed rectangle shape, with an outer curved edge and an inner curved edge that each have approximately the same curvature as the outer edge 26 of the disc 16.

A lifter 22 affixed to or integrally formed with an inner surface 40 of back shell 14 applies an upward pressure on the fabric liner 20. Back shell 14, as well as cover shell 12, may be formed from plastic such as high-impact polystyrene or ABS. In FIG. 1, lifter 22 comprises a plurality of projections that can be integrally formed with the inner surface of the back shell 14, e.g., by injection molding. As the disc 16 rotates in the cartridge 10, lifter 22 causes the fabric 20 to rub against the disc, thereby cleaning the disc as the disc rotates.

Figure 2:
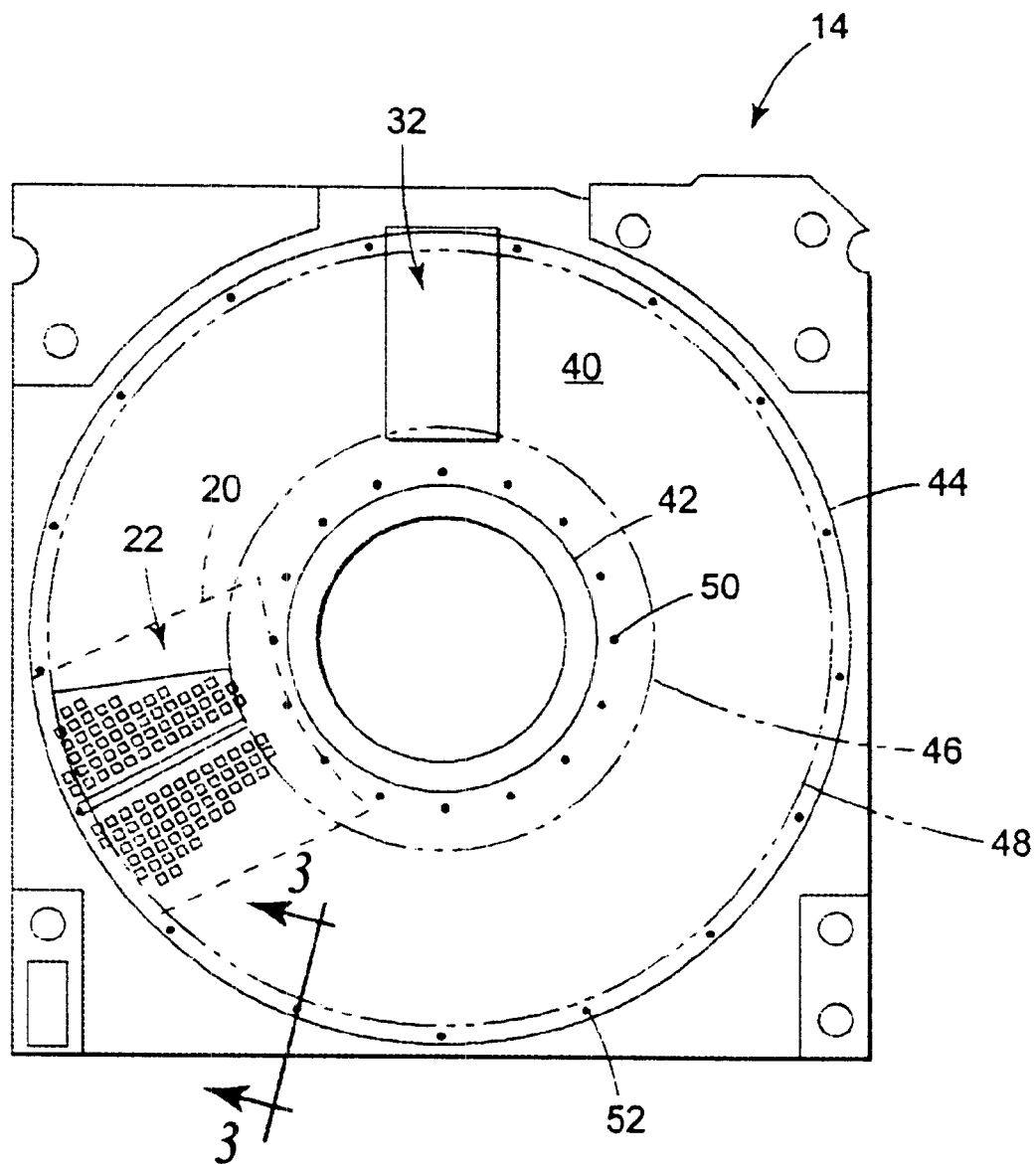
FIG. 2 is a plan view of the inner surface of a back shell of a magnetic recording diskette.

The back shell 14 is shown in more detail in FIG. 2, which depicts one embodiment of the present invention. FIG. 2 shows the inner surface of the media compartment 40 defined by back shell 14. Back shell 14 may include a circular rib 42 defining the inner periphery of the media compartment and a circular rib 44 defining the outer periphery of the media compartment. The area of the surface of the media compartment 40 is slightly larger than the area of the flexible surface 24 of the disc 16, allowing the disc to rotate in the compartment. Magnetic recording disc 16, when placed in cartridge 10, rotates within the outer periphery 44. Although the entire flexible surface 24 of disc 16 is typically coated with recording material, disc 16 does not include data tracks along its entire flexible surface. FIG. 2 shows the approximate diameters of innermost data storage tracks 46 and the outermost data storage tracks 48. Lifter 22 is depicted as a plurality of protrusions, including a raised rib and several small raised platforms. The lifter 22 depicted in FIG. 2 is exemplary, and the invention may be employed with lifters of other sizes, positions or configurations. The outline of fabric liner 20 is shown in FIG. 2, illustrating that fabric liner 20 covers lifter 22 and the area around lifter 22. Liner 20 is arcuate in shape and will be described in more detail below.

Liner 20 is affixed to back shell 14. Ordinarily, liner 20 is placed as shown in FIG. 2, and liner 20 becomes affixed by application of a heat bar to the liner. Heat from the heat bar passes through the fabric liner 20 and melts a small region of plastic back shell 14. When the plastic hardens again, the plastic clings to the fabric. Liner 20 is typically affixed to back shell 14 at several points near the liner's periphery.

On inner surface 40, between inner rib 42 and innermost data track 46, are a plurality of small protrusions, or bumps 50. Also on inner surface 40, between outer rib 44 and outermost data track 48, is a second plurality of bumps 52. The purpose of the bumps 50, 52 is to raise the disc media 16 above the surface 40 of the back shell 14. The liner 20 is interposed between the surface 40 and the disc 16 around the lifter 22, but is not interposed between the surface and the disc throughout the media compartment between inner rib 42 and outer rib 44.

Without the bumps, and with a liner 20 considerably smaller than the disc 16, the disc tends to contact the surface as the disc rotates. Over time, the disc 16 abrades the surface 40. Abrasion causes damage to the disc and reduces the useful life of the media. In addition, abrasion may cause the outer edge 26 to sharpen and begin cutting into the surface of the compartment, thus generating debris in the compartment. The bumps 50, 52 force the disc 16 away from the surface 40 and thus prevent abrasion and maintain the durability of the media. Bumps 50, 52 are located outside of the innermost and outermost tracks 46, 48, and therefore do not contact the disc 16 on a portion of the flexible surface 24 used to store information.

Figure 3:
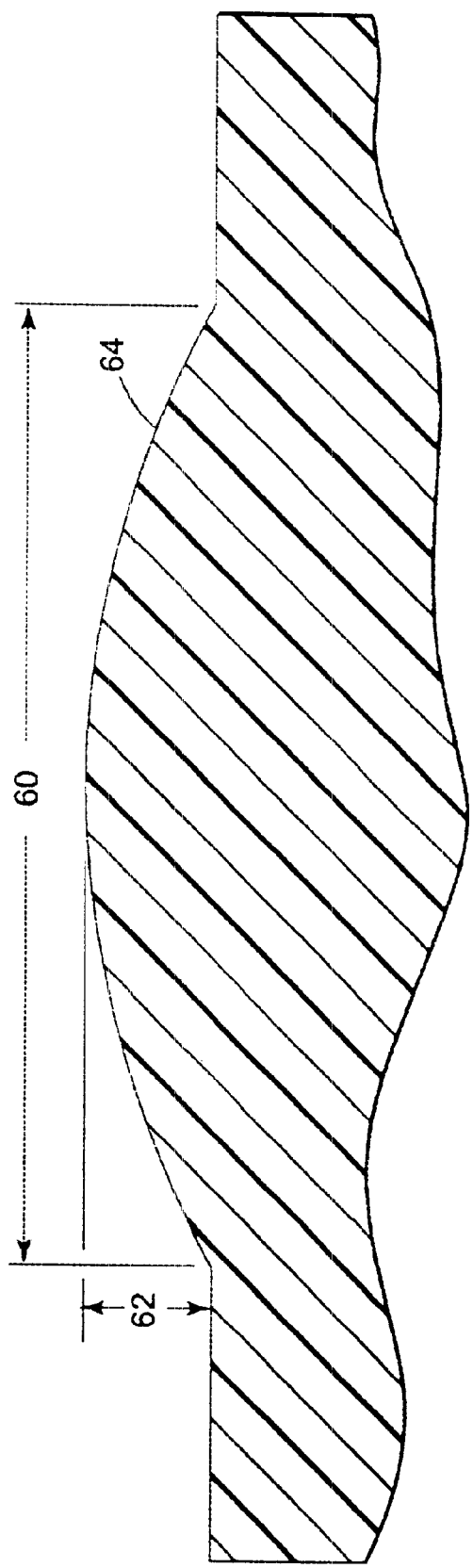
FIG. 3 is an enlarged cross-sectional view taken along 3—3 in FIG. 2.

Bumps 50, 52 are formed during the molding process of back shell 14. The number of bumps 50, 52 shown in FIG. 2 is exemplary, and more or fewer bumps could be present. FIG. 3 shows a cross-sectional view of a typical bump 50, 52. The surface 64 may be generally spherical. In an exemplary embodiment, the height 62 of the bump is approximately $4/1000$ of an inch (0.0102 cm) and the raised diameter is approximately $30/1000$ of an inch (0.076 cm). Protrusions in the form of integral spherically-surfaced bumps represent an efficient approach for raising the disc media 16 above the surface 40 of the back shell 14, but protrusions of different shapes and dimensions may also be used. For example, the protrusion may be in the form of a raised platform, or in the form of a ridge. In addition, the protrusion may be affixed to the inner surface 40 of the back shell 14 rather than integrally formed with the shell.

Figure 4:
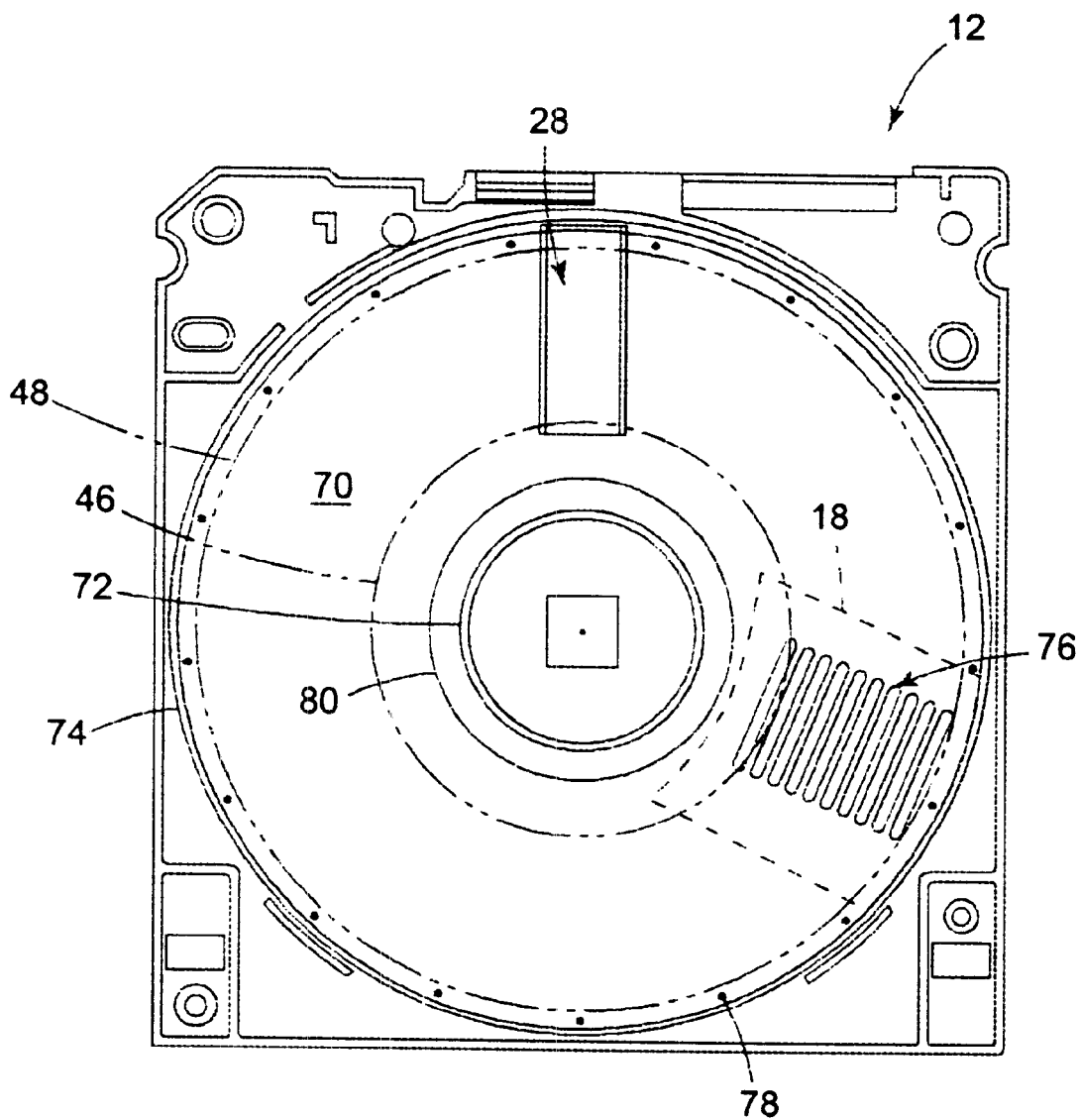
FIG. 4 is a plan view of the inner surface of a cover shell of a magnetic recording diskette.

FIG. 4 shows the inner surface 70 of a cover shell 12. Cover shell 12 may include a ridge 72 that cooperates with the hub 30 of the disc 16 to keep the disc centered in the cartridge 10. Cover shell 12 may also include an inner rib 80 and an outer rib 74. Like back shell 14, cover shell 12 may be formed from ABS plastic. A raised structure 76 is formed on cover shell 12 and positioned on the inner surface 70 so that raised structure 76 does not lie directly above lifter 22 on the inner surface 40 of back shell 14 when the two shells are assembled together.

As shown in FIG. 4, the raised structure 76 may comprise an array of tangential ridges extending above the inner surface 70, and can be integrally formed with cover shell 12, e.g., by injection molding. The raised structure 76 depicted in FIG. 4 is exemplary, and the invention may be employed with raised structures of other sizes, positions or configurations. The raised structure 76 acts to deflect the disc 16, in combination with the lifter 22, during rotation to effect sufficient cleaning of the disc by liners 18 and 20 without excessive torque. The outline of fabric liner 18 is shown in FIG. 4, illustrating that fabric liner 18 covers raised structure 76 and the area around raised structure 76. Liner 18, like back shell liner 20, may be arcuate in shape. Liner 18 may be affixed to cover shell 12 in a manner like liner 20 is affixed to back shell 14, and is typically affixed at several points near the liner's periphery.

The inner surface 70 of cover shell 12 may include a plurality of small protrusions, or bumps 78, between outer rib 74 and outermost track 48. Bumps 78 are complementary to bumps 52 shown in FIG. 2. Bumps 78 may be of approximately the same dimensions as bumps 52 and may be formed by molding in the same way. The purpose of the bumps 78 is to force the disc media 16 away from the interior surface 70 of the cover shell 12 and to prevent the disc from abrading the surface as the disc rotates. Bumps 78 preferably do not contact the disc 16 on a portion used to store information.

As illustrated in the example of FIG. 4, cover shell 12 does not include a plurality of protrusions complementary to bumps 50 shown in FIG. 2 to lower the inner portions of disc 16. Instead, inner rib 80 forces the inner portions of disc media 16 away from the surface 70 of the cover shell 12. FIG. 4 illustrates that a protrusion may be in a form other than bumps. Inner rib 80 could be supplanted by other forms of protrusions, such as ridges or bumps.

When the cartridge 10 is assembled, the components cooperate in the following manner. As the disc 16 rotates over lifter 22, the side of the disc medium facing lifter 22 is cleaned by fabric liner 20. As the same portion of the disc medium 16 then moves under raised structure 76, the side of the medium facing raised structure 76 is cleaned by fabric liner 18. Protrusions 50, 52, 78 and 80 force the media 18 away from the inner surfaces 40, 70 of the cartridge 10, and prevent the disc from abrading the surfaces.

Liners may be of any size. An advantage of the invention is that the liner need not cover most of the surfaces 40, 70 of the media compartment. The surface area of liner may be, for example, fifty percent or less of the area of the media compartment, or fifty percent or less of the surface area of the flexible surface 24 of the disc 16. In the embodiment depicted in FIGS. 1, 2 and 4, the surface area of each liner 18 and 20 is less than fifteen percent of the surface area of the flexible surface 24, representing a significant reduction in the amount of material used to form the liners and an associated cost reduction.

Liners 18 and 20 may be of any shape to cover the lifter 22 and raised structure 76, respectively, and the area around the lifter and raised structure. Typically a liner's surface area will be greater than five percent or more of the area of the media compartment, or five percent or more of the surface area of the flexible surface 24 of the disc 16. A lifter or raised structure may be, for example, square, rectangular, circular, oval-shaped, trapezoidal, or truncated-wedge-shaped. Similarly, liners may be, for example, square, rectangular, circular, oval-shaped, trapezoidal, or truncated-wedge-shaped or may take on any shape depending on the lifter or raised structure they cover. The arcuate or bowed rectangular shape shown in FIGS. 1, 2 and 4, however, provides several advantages. First, the arcuate shape provides coverage for the lifter and raised structure. Second, the arcuate shape allows the liners 18 and 20 to clean disc 16 between innermost data storage tracks 46 and the outermost data storage tracks 48. Third, liners with the arcuate shape can be mass-manufactured with very little waste of fabric.

Figure 5:
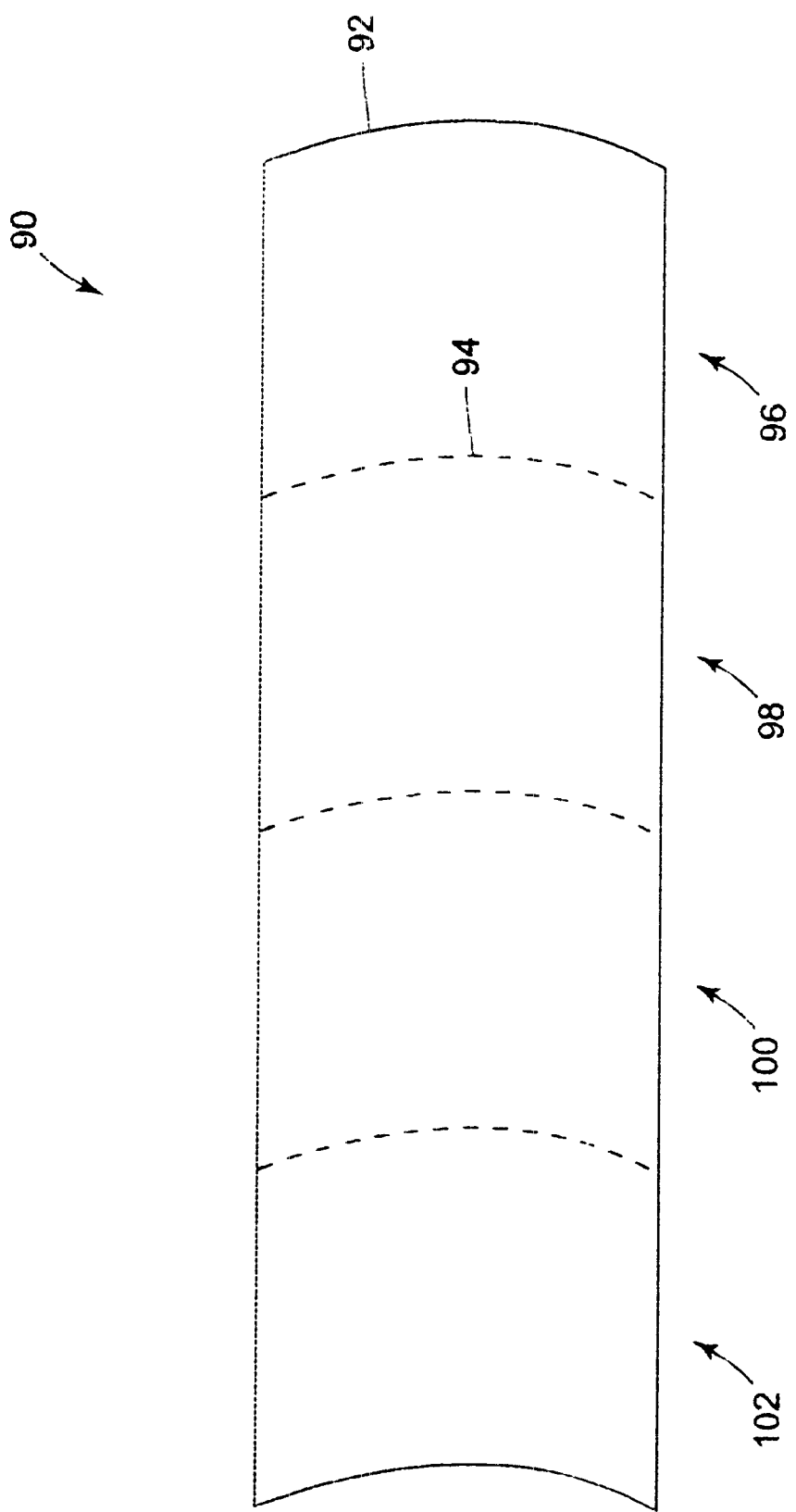
FIG. 5 is a plan view of a strip of fabric cut into liners.

FIG. 5 illustrates a waste-reduced mass-production of arcuate liners such as liners 18 and 20. FIG. 5 shows a strip of material 90 for making fabric liners. The strip 90 may be of any length, although in FIG. 5 the strip is of sufficient length to be divided into four liners 96, 98, 100, 102. A typical width of the strip 90 is about an inch (2.54 cm), but the strip may be wider or narrower to provide coverage for a particular lifter or raised structure. An exemplary liner 96 from the strip 90 is identical in shape to the other liners 98, 100, 102. As FIG. 5 illustrates, a strip 90 can be cut into a plurality of liners with no waste of fabric. The strip 90 may be cut with a cutting tool such as a scissors-type blade or a die. Exemplary liner 96 includes an outer edge 92 and an inner edge 94. Outer edge 92 and inner edge 94 have the same curvature. The line defining the inner edge 94 of liner 96 also defines the outer edge of liner 98. In addition, outer edge 92 and inner edge 94 have approximately the same curvature of the circumference of the disc 16. The exemplary liner 96 has an area of about one square inch (6.45 square cm).

A number of embodiments of the invention have been described. These and other embodiments are within the scope of the following claims.

What is claimed is:

1. A data storage cartridge comprising:

a magnetic recording disc including a flexible surface;

a first shell and a second shell including inner surfaces that define a media compartment to accommodate the magnetic recording disc;

a fabric liner secured to one of the first shell and the second shell within the media compartment; and a protrusion on at least one of the inner surfaces, the protrusion making contact with the magnetic recording disc and forcing the magnetic recording disc away from the inner surface, wherein the area of the fabric liner is less than fifty percent of the area of the flexible surface of the magnetic recording disc.

2. The cartridge of claim 1, further comprising:

a second fabric liner secured to the other of the first shell and the second shell, wherein the area of the second fabric liner is less than fifty percent of the area of the flexible surface of the magnetic recording disc.

3. The cartridge of claim 1, wherein the area of the fabric liner is less than twenty-five percent of the area of the flexible surface of the magnetic recording disc.

4. The cartridge of claim 1, wherein the area of the fabric liner is between five and fifteen percent of the area of the flexible surface of the magnetic recording disc.

5. The cartridge of claim 1, wherein the magnetic recording disc includes an innermost data storage track and an outermost data storage track, and the liner is so dimensioned to extend across the innermost data storage track and the outermost data storage track.

6. The cartridge of claim 1, wherein the magnetic recording disc includes an innermost data storage track and an outermost data storage track, and wherein the protrusion is located in at least one of radially inward of the innermost data storage track and radially outward of the outermost data storage track.

7. The cartridge of claim 1, wherein the liner has an arcuate shape.

8. The cartridge of claim 1, further comprising a lifter secured to at least one of the inner surfaces, wherein the fabric liner covers the lifter.

9. An article of manufacture comprising:

a magnetic recording disc including a flexible surface; and a shell defining a media compartment to accommodate the magnetic recording disc, wherein the shell includes a protrusion in the media compartment, the protrusion making contact with the magnetic recording disc and forcing the magnetic recording disc away from an interior surface of the media compartment, and wherein the shell includes a lifter secured to the inner surface of the media compartment.

10. The article of claim 9, wherein the protrusion is a circular rib.

11. The article of claim 9, wherein the shell includes a plurality of protrusions in the media compartment, the protrusions arranged in a circular pattern.

12. The article of claim 9, wherein the magnetic recording disc includes an innermost data storage track and an outermost data storage track, and wherein the protrusion is located in at least one of radially inward of the innermost data storage track and radially outward of the outermost data storage track.

13. The article of claim 9, further comprising a fabric liner secured within the media compartment of the shell.

14. The article of claim 13, wherein the fabric liner covers the lifter.

15. A method comprising:

providing a cartridge to enclose a magnetic recording disc, the cartridge including a media compartment with an inner surface;

providing a protrusion in the media compartment;

making contact between the magnetic recording disc and the protrusion to keep the magnetic recording disc from contacting the inner surface of the compartment; and providing at least one of a lifter and a raised structure secured to the inner surface of the media compartment.

16. The method of claim 15, further comprising:

providing a lifter secured to the inner surface of the media compartment; and providing a fabric liner secured to the inner surface of the media compartment, wherein the liner is interposed between the magnetic recording disc and the lifter.

17. The method of claim 15, further comprising:

providing a raised structure secured to the inner surface of the media compartment; and providing a fabric liner secured to the inner surface of the media compartment, wherein the liner is interposed between the magnetic recording disc and the raised structure.

18. A 3.5 inch (8.9 cm) form factor floppy magnetic recording diskette comprising:

a magnetic recording disc including a flexible surface;

a back shell;

a cover shell configured to be joined to the back shell, wherein the back shell and the cover shell define a media compartment, having interior surfaces, to accommodate the magnetic recording disc;

a first fabric liner secured to the back shell within the media compartment; and a second fabric liner secured to the cover shell within the media compartment;

wherein the area of each fabric liner is less than fifty percent of the area of the flexible surface of the magnetic recording disc;

wherein the back shell includes a first protrusion in the media compartment;

wherein the cover shell includes a second protrusion in the media compartment; and wherein the protrusions force the magnetic recording disc away from the interior surfaces of the media compartment.

19. A data storage cartridge comprising:

a magnetic recording disc including a flexible surface;

a first shell and a second shell including inner surfaces that define a media compartment to accommodate the magnetic recording disc, a lifter secured to at least one of the inner surfaces; and a fabric liner secured within the media compartment and interposed between the magnetic recording disc and the lifter, wherein the area of the fabric liner is less than fifty percent of the area of the flexible surface of the magnetic recording disc.

20. The cartridge of claim 19, further comprising:

a second fabric liner secured to the other of the first shell and the second shell, wherein the area of the second fabric liner is less than fifty percent of the area of the flexible surface of the magnetic recording disc.

21. The cartridge of claim 19, wherein the magnetic recording disc includes an innermost data storage track and an outermost data storage track, and the liner is so dimensioned to extend across the innermost data storage track and the outermost data storage track.

22. The cartridge of claim 19, further comprising a protrusion on at least one of the inner surfaces, the protrusion making contact with the magnetic recording disc and forcing the magnetic recording disc away from the inner surface.

23. The cartridge of claim 22, wherein the magnetic recording disc includes an innermost data storage track and an outermost data storage track, and wherein the protrusion is located in at least one of radially inward of the innermost data storage track and radially outward of the outermost data storage track.

24. The cartridge of claim 19, wherein the liner has an arcuate shape.

* * * * *